United States Patent
Yu et al.

(10) Patent No.: US 12,266,294 B2
(45) Date of Patent: Apr. 1, 2025

(54) DISPLAY CONTROL METHOD AND DEVICE, DISPLAY SYSTEM, ELECTRONIC DEVICE, AND STORAGE MEDIUM

(71) Applicant: BOE TECHNOLOGY GROUP CO., LTD., Beijing (CN)

(72) Inventors: Chao Yu, Beijing (CN); Quanzhong Wang, Beijing (CN); Xingqun Jiang, Beijing (CN); Jian Wu, Beijing (CN); Yao Wang, Beijing (CN); Tieli Chen, Beijing (CN); Xiaodong Shi, Beijing (CN); Hu Zhu, Beijing (CN); Hui Qiao, Beijing (CN); Jinlei Li, Beijing (CN); Dongbo Cao, Beijing (CN); Tao Li, Beijing (CN); Genyu Liu, Beijing (CN); Binbin Chi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 13 days.

(21) Appl. No.: 18/300,885

(22) Filed: Apr. 14, 2023

(65) Prior Publication Data

US 2023/0252939 A1 Aug. 10, 2023

Related U.S. Application Data

(63) Continuation-in-part of application No. 17/309,848, filed as application No. PCT/CN2020/126750 on Nov. 5, 2020, now abandoned.

(30) Foreign Application Priority Data

Nov. 8, 2019 (CN) .......................... 201911093920.1

(51) Int. Cl.
*G09G 3/32* (2016.01)

(52) U.S. Cl.
CPC .......... *G09G 3/32* (2013.01); *G09G 2300/026* (2013.01); *G09G 2310/08* (2013.01); *G09G 2370/16* (2013.01)

(58) Field of Classification Search
CPC ............... G09G 3/32; G09G 2300/026; G09G 2310/08; G09G 2370/16; G06F 3/1446; G06F 3/147; H10K 59/18; B32B 2607/00
See application file for complete search history.

(56) References Cited

U.S. PATENT DOCUMENTS

| 9,336,748 | B1 | 5/2016 | Katsis et al. |
| 2009/0128524 | A1 | 5/2009 | Young et al. |

(Continued)

FOREIGN PATENT DOCUMENTS

| CN | 101202568 A | 6/2008 |
| CN | 101587431 A | 11/2009 |

(Continued)

OTHER PUBLICATIONS

Office Action dated Aug. 26, 2021 issued in corresponding Chinese Application No. 201911093920.1.

(Continued)

*Primary Examiner* — Matthew A Eason
*Assistant Examiner* — Sujit Shah
(74) *Attorney, Agent, or Firm* — Nath, Goldberg & Meyer; Joshua B. Goldberg

(57) ABSTRACT

The present disclosure provides a display control method of a spliced screen including a plurality of sub-display screens, including: sending a display control signal to each sub-display screen in a wireless sending manner according to a time code signal; receiving, by each sub-display screen, the display control signal in a wired receiving manner, and reporting status information of each sub-display screen to the display controller; and controlling, by the display con- (Continued)

troller, displaying of each sub-display screen according to the status information of each sub-display screen, where the time code signal indicates a current time point; the display control signal is configured for controlling the sub-display screen to perform corresponding display processing on display content stored, so that the sub-display screens display a target display content together. The present disclosure further provides a display control device, a display system, an electronic device, and a computer readable storage medium.

18 Claims, 3 Drawing Sheets

(56) References Cited

U.S. PATENT DOCUMENTS

| | | | |
|---|---|---|---|
| 2014/0307168 A1* | 10/2014 | Law | G09G 5/12 |
| | | | 348/500 |
| 2015/0035994 A1 | 2/2015 | Son et al. | |
| 2015/0234631 A1* | 8/2015 | Yu | G09G 5/008 |
| | | | 345/520 |
| 2015/0293740 A1* | 10/2015 | Cho | H04N 21/42215 |
| | | | 345/1.2 |
| 2018/0181252 A1* | 6/2018 | Park | G06F 3/147 |
| 2018/0192093 A1 | 7/2018 | Loheide et al. | |
| 2019/0369860 A1* | 12/2019 | Purevdorj | G09G 5/14 |
| 2020/0042275 A1* | 2/2020 | Yueh | G06F 3/147 |
| 2020/0043403 A1* | 2/2020 | Jo | G06F 3/1446 |
| 2020/0100255 A1* | 3/2020 | Wu | H04W 4/023 |

FOREIGN PATENT DOCUMENTS

| | | |
|---|---|---|
| CN | 102724560 A | 10/2012 |
| CN | 202587205 U | 12/2012 |
| CN | 104035740 A | 9/2014 |
| CN | 104866265 A | 8/2015 |
| CN | 104918137 A | 9/2015 |
| CN | 105489155 A | 4/2016 |
| CN | 105867861 A | 8/2016 |
| CN | 205451036 U | 8/2016 |
| CN | 106791272 A | 5/2017 |
| CN | 110413248 A | 11/2019 |

OTHER PUBLICATIONS

Second Office Action issued on Mar. 4, 2022 for application No. CN201911093920.1.
International Search Report issued on Dec. 30, 2020 for application No. PCT/CN2020/126750 with English translation attached.
Non-final rejection issued on Jul. 7, 2022 for U.S. Appl. No. 17/309,848.
Reconsideration after final issued on on Oct. 7, 2022 for U.S. Appl. No. 17/309,848.
Final Rejection issued on Dec. 15, 2022 for U.S. Appl. No. 17/309,848.

* cited by examiner

DISPLAY CONTROL METHOD AND DEVICE, DISPLAY SYSTEM, ELECTRONIC DEVICE, AND STORAGE MEDIUM

CROSS-REFERENCE TO RELATED APPLICATIONS

This is a Continuation-In-Part of U.S. patent application Ser. No. 17/309,848, filed Jun. 23, 2021, a National Phase Application filed under 35 U.S.C. 371 as a national stage of PCT/CN2020/126750 filed on Nov. 5, 2020, an application claiming the benefit of Chinese application No. 201911093920.1 filed on Nov. 8, 2019, the content of each of which is hereby incorporated by reference in its entirety.

TECHNICAL FIELD

The present disclosure relates to the field of display technology, and in particular to a display control method, a display control device, a display system, an electronic device and a computer readable storage medium for a spliced screen.

BACKGROUND

A spliced screen includes a plurality of sub-display screens which can independently display, and display contents of all the sub-display screens are spliced together to form a complete target display content. The spliced screen may be used in large-scale performances, and at present, in the process of performing by using the spliced screen, the sub-display screens are fixedly installed on supporting structures and receive the display contents to be displayed in a wired transmission manner.

SUMMARY

The present disclosure provides a display control method of a spliced screen, where the spliced screen includes a plurality of sub-display screens, and the display control method includes: sending, by a display controller, a display control signal to each sub-display screen in a wireless sending manner according to a time code signal; receiving, by each sub-display screen, the display control signal in a wired receiving manner, and reporting status information of each sub-display screen to the display controller; and controlling, by the display controller, displaying of each sub-display screen according to the status information of each sub-display screen, where the time code signal indicates a current time point, the display control signal is configured for controlling the sub-display screen to perform corresponding display processing on a display content stored in the sub-display screen, so that the sub-display screens display a target display content together.

In some implementations, the status information of each sub-display screen includes at least one of: status information indicating that the display control signal is received, status information indicating a signal intensity of the display control signal received, or status information indicating a time at which the display control signal is received.

In some implementations, the controlling, by a display controller, displaying of each sub-display screen according to the status information of each sub-display screen, includes: after determining that the display control signal is received by all the sub-display screens, sending, by the display controller, an instruction including a start time to each sub-display screen; and in response to that the start time reaches, starting to perform the corresponding display processing by each sub-display screen on the display content stored in the sub-display screen.

In some implementations, the display control signal, after being received, is converted into a wired signal to be transmitted through a wire, and in response to that the start time reaches, a corresponding processor is controlled by each sub-display screen through the wired signal to perform the corresponding display processing on the display content stored in the sub-display screen.

In some implementations, the display control method further includes: synchronizing each sub-display screen with the display controller in time; and in response to that the display control signal is not received by any sub-display screen before a preset time, the sub-display screen entering an independent display mode and controlling a corresponding processor, by a wired signal transmitted through a wire, to perform the corresponding display processing on the display content stored in the sub-display screen according to a preset displaying schedule.

In some implementations, the display control signal includes: a display start control signal; the sending, by a display controller, a display control signal to each sub-display screen in a wireless sending manner according to a time code signal includes: in response to the time code signal indicating that the current time point reaches a display start point of the target display content, sending the display start control signal by the display controller to each sub-display screen, where the display start control signal is configured for controlling the sub-display screen to start to display the display content stored in the sub-display screen.

In some implementations, the display control signal further includes: a display stop control signal; the sending, by a display controller, a display control signal to each sub-display screen in a wireless sending manner according to a time code signal further includes: in response to the time code signal indicating that the current time point reaches a display end point of the target display content, sending the display stop control signal by the display controller to each sub-display screen, where the display stop control signal is configured for controlling the sub-display screen to stop displaying.

In some implementations, the target display content includes N target segments distributed according to a time axis, the display content stored in each sub-display screen includes N sub-segments in one-to-one correspondence with the N target segments, N is an integer greater than 1; the display control signal further includes: a display switching control signal; the sending, by a display controller, a display control signal to each sub-display screen in a wireless sending manner according to a time code signal further includes: in response to the time code signal indicating that the current time point reaches a display point of the $i^{th}$ target segment, sending the display switching control signal by the display controller to each sub-display screen, where the display switching control signal is configured for controlling the sub-display screen to start to display the $i^{th}$ sub-segment stored in the sub-display screen; i is an integer greater than 1 and not greater than N.

In some implementations, the display control signal further includes: a brightness adjusting signal; the sending, by a display controller, a display control signal to each sub-display screen in a wireless sending manner according to a time code signal further includes: in response to that the current time point indicated by the time code signal reaches a preset brightness adjusting point, sending the brightness adjusting signal by the display controller to each sub-display screen, where the brightness adjusting signal is configured for adjusting brightness of each sub-display screen.

In some implementations, before sending, by the display controller, the display control signal to each sub-display screen in the wireless sending manner according to the time code signal, the method further includes: acquiring the target display content to be displayed on the spliced screen; determining the display content to be displayed on each sub-display screen according to a resolution of the target display content, a resolution of each sub-display screen and a position of each sub-display screen in the spliced screen; issuing the display content to be displayed on each sub-display screen to said each sub-display screen so that each sub-display screen stores the display content to be displayed.

Correspondingly, the present disclosure further provides a display control device of a spliced screen, the spliced screen includes a plurality of sub-display screens, and the display control device includes: a display controller configured to send a display control signal to each sub-display screen in a wireless sending manner according to a time code signal, receive status information of each sub-display screen reported by the sub-display screen, and control displaying of each sub-display screen according to the status information of the sub-display screen, where the time code signal indicates a current time point; the display control signal is configured for controlling each sub-display screen to perform corresponding display processing on a display content stored in the sub-display screen, so that the sub-display screens display a target display content together.

In some implementations, the status information of each sub-display screen includes at least one of: status information indicating that the display control signal is received, status information indicating a signal intensity of the display control signal received, or status information indicating a time at which the display control signal is received.

In some implementations, the display controller is configured to: send an instruction including a start time to each sub-display screen after determining that the display control signal is received by all the sub-display screens, to instruct each sub-display screen starts, in response to that the start time reaches, to perform the corresponding display processing on the display content stored in the sub-display screen.

In some implementations, the display controller is configured to: instruct each sub-display screen controls, in response to that the start time reaches, a corresponding processor signal, by a wired signal transmitted through a wire and converted from the display control signal, to perform the corresponding display processing on the display content stored in the sub-display screen.

In some implementations, the display controller is further configured to be synchronized with each sub-display screen in time.

In some implementations, the display control signal includes: a display start control signal; the display controller includes: a processor configured to determine whether the time code signal indicates that the current time point reaches a display start point of the target display content; a signal transmitter configured to send the display start control signal to each sub-display screen in response to the time code signal indicating that the current time point reaches the display start point of the target display content, where the display start control signal is configured for controlling the sub-display screen to start displaying the display content stored in the sub-display screen.

In some implementations, the target display content includes N target segments distributed according to a time axis, the display content stored in each sub-display screen includes N sub-segments in one-to-one correspondence with the N target segments, N is an integer greater than 1; the display control signal further includes: a display switching control signal; the processor is further configured to determine whether the time code signal indicates that the current time point reaches a display point of the $i^{th}$ target segment; the signal transmitter is further configured to send the display switching control signal to each sub-display screen in response to the time code signal indicating that the current time point reaches the display point of the $i^{th}$ target segment, where the display switching control signal is configured for controlling the sub-display screen to start displaying the $i^{th}$ sub-segment stored in the sub-display screen; i is an integer greater than 1 and not greater than N.

Correspondingly, the present disclosure further provides a display system including: a spliced screen, a time code generator and the display control device described above, the time code generator is configured to generate a time code signal according to a current time point and send the time code signal to the display control device; the spliced screen includes a plurality of sub-display screens, and each sub-display screen is configured to perform corresponding display processing on the display content stored in the sub-display screen according to a display control signal sent by the display control device, so that the sub-display screens display a target display content together.

The present disclosure further provides an electronic device, which includes a memory and a processor, where the memory stores a computer program, and the computer program, when executed by the processor, enables the display control method described above to be implemented.

The present disclosure further provides a computer readable storage medium on which a computer program is stored, the program, when executed by a processor, enables the display control method described above to be implemented.

DESCRIPTION OF DRAWINGS

The accompanying drawings, which are included to provide a further understanding of the present disclosure and are incorporated in and constitute a part of this specification, illustrate embodiments of the present disclosure and together with the description serve to explain the present disclosure, but do not constitute a limitation of the present disclosure. In the drawings.

DESCRIPTION OF EMBODIMENTS

The following detailed description of embodiments of the present disclosure refers to the accompanying drawings. It should be understood that the detailed description and specific examples, while indicating the present disclosure, are given by way of illustration and explanation only, not limitation.

Figure 1:
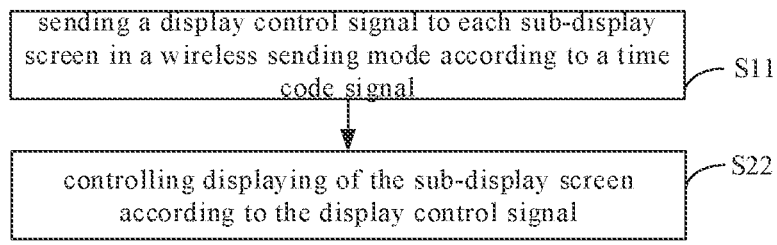
FIG. 1 is a schematic flowchart of a display control method of a spliced screen according to an embodiment of the present disclosure.

In a first aspect, the present disclosure provides a display control method for a spliced screen, where the spliced screen includes a plurality of sub-display screens. FIG. 1 is a schematic flowchart of a display control method of a spliced screen according to an embodiment of the present disclosure, and as shown in FIG. 1, the display control method includes: S11, sending a display control signal to the sub-display screen in a wireless sending manner according to a time code signal; and S22, controlling displaying of the sub-display screen according to the display control signal.

The time code signal indicates a current time point. The display control signal is configured for controlling the sub-display screen to perform corresponding display processing on a display content stored in the sub-display screen, so that sub-display screens can display a target display content together.

Figure 2:
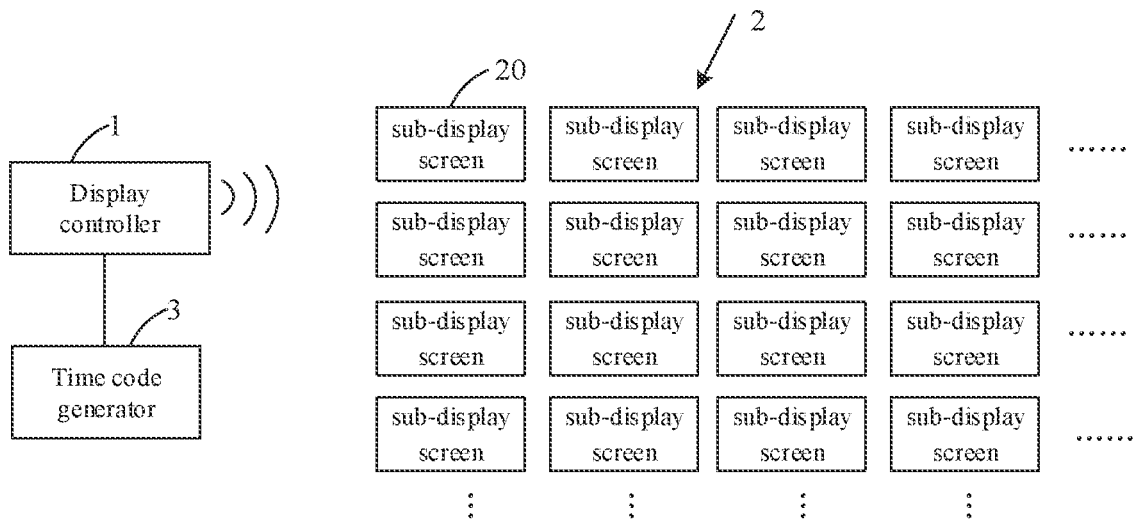
FIG. 2 is a schematic diagram of an application scenario of a display control method according to an embodiment of the present disclosure.

In the embodiment of the present disclosure, the spliced screen is particularly suitable for large-scale performance. During the performance, the time code signal may be generated by a time code generator of a sound control console. FIG. 2 is a schematic diagram of an application scenario of a display control method according to an embodiment of the present disclosure, and as shown in FIG. 1 and FIG. 2, the S11 of the display control method may be executed by the display controller 1, where the display controller 1 may be a wireless signal base station, and the wireless signal base station may transmit the display control signal through broadcasting. The broadcasting method includes, but is not limited to, an LoRa (Long Range Radio) method. The time code generator 3 transmits the time code signal to the display controller 1, and the display controller 1 transmits the display control signal to each sub-display screen 20 based on the time code signal.

The sound control console may be coupled to a sound source device, and the sound source device provides an audio signal corresponding to the target display content. The sound control console receives the audio signal provided by the sound source device, processes and outputs the received audio signal through an audio output device, meanwhile, the time code generator 3 starts to output time code signals, and during the audio output device outputs the audio signal, the time code generator 3 continuously generates and outputs the time code signals at preset time intervals. Illustratively, at an initial moment when the sound control console receives the audio signal provided by the sound source device, the time code signal generated by the time code generator 3 is "0", and then, while the sound control console continues to receive the audio signal, the time code generator 3 sequentially outputs the time code signals "1", "2", "3", "4" . . . at preset time intervals, and meanwhile, the audio output device of the sound control console outputs the processed audio signal. The preset time interval may be 1 ms or other relatively short time interval.

In S11, the display controller 1 may transmit the display control signal to the sub-display screen 20 according to the time point indicated by the time code signal, so that the target display content displayed on the spliced screen 2 is synchronized with the audio signal output by the sound control console. The display control signal may include a plurality of control signals, and different control signals may control the sub-displays to perform different display processes. For example, the display control signal may be a control signal for controlling the sub-displays to start displaying; alternatively, the display control signal may be a control signal for controlling the sub-displays to stop displaying, or the like.

In an actual performance process, the time code signal may be simultaneously sent to the display controller 1 and a light controller, and the light controller can control stage lighting according to the time code signal, so that the display content displayed by the spliced screen is synchronous with the stage lighting and the audio signal output by the sound control console.

In the embodiment of the present disclosure, when the spliced screen 2 displays, the sub-display screens do not need to acquire data of display contents in a wired connection manner, and each sub-display screen can be controlled to display the display content stored therein in a wireless signal transmission manner, so that the sub-display screens display the complete target display content in a spliced manner. According to the display control method provided by the embodiment of the present disclosure, each sub-display screen does not need to be coupled to a signal line, so that a novel display control mode is provided for the spliced screen. With such display control mode, when the spliced screen is used for performance, each sub-display screen may be a stage property in an actor's hand, which is capable of being moved on the stage at will, thereby presenting a new type performance mode. In the performance process, the display effect of the sub-display screen will not be affected due to the fault of the signal line, and thus the sub-display screen is more reliable.

Each time the display controller 1 sends the display control signal, the display control signal may be sent through two frequencies (a primary frequency and a standby frequency) at the same time, so as to ensure that the sub-display screen can receive the display control signal.

Figure 3:
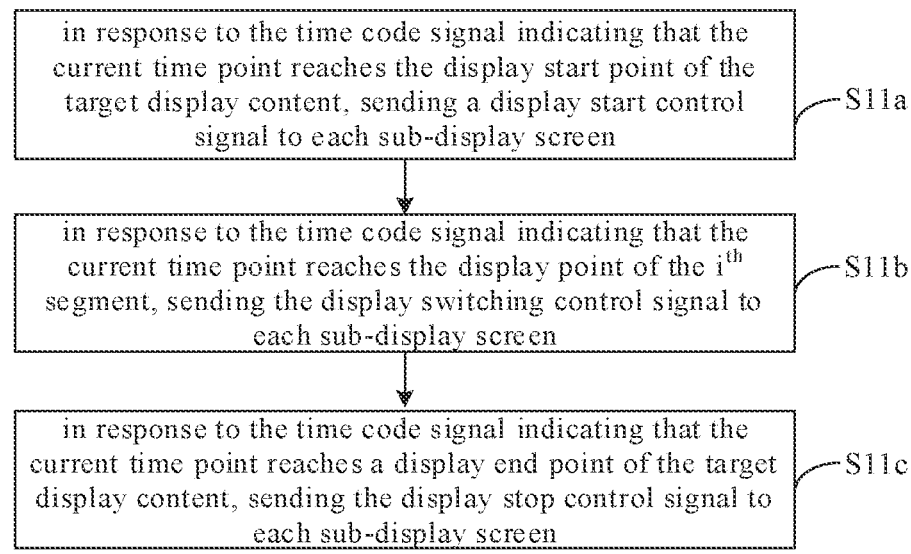
FIG. 3 is a partial schematic flowchart of a display control method according to an embodiment of the present disclosure.

FIG. 3 is a flowchart illustrating an alternative manner of S11 in the display control method according to the embodiment of the present disclosure. For example, the display control signal may include: a display start control signal. As shown in FIG. 3, the S11 may include the following S11a to S11c.

S11a, in response to the time code signal indicating that the current time point reaches the display start point of the target display content, sending a display start control signal to each sub-display screen, where the display start control signal is configured for controlling the sub-display screen to start displaying the display content stored in the sub-display screen.

The display start point of the target display content may be a theoretical time point when the target display content starts to be displayed, or may be a time point which is earlier than the theoretical time point and is separated from the theoretical time point by a preset preparation time. For example, a time code transmitter transmits the time code signal at a certain frequency, and the theoretical time point at which the target display content starts to be displayed is the time point indicated by the time code signal of "10", that is, when the time code signal is "10", the target display content starts to be displayed, and the sound control console outputs the audio signal. In such case, the display start control signal may be transmitted to each sub-display screen when the time code signal is "10". Since the sub-display screen may require a certain preparation time from the time when the display start control signal is received to the time when the display is started, in actual operations, the display start control signal may be sent to each sub-display panel when the time code signal is "8".

In some implementations, the target display content includes N target segments distributed according to a time axis, the display content stored in each sub-display screen includes N sub-segments corresponding to the N target segments one to one, and N is an integer greater than 1. That is, when all the sub-display screens synchronously display the $n^{th}$ sub-segments, the $n^{th}$ target segment of the target display content is spliced, where n is an integer and is greater than 0 and less than or equal to N.

In some implementations, the display control signal may further include: a display switching control signal. In such case, the S11 may further include: S11b, in response to the time code signal indicating that the current time point reaches the display point of the $i^{th}$ segment, sending the display switching control signal to each sub-display screen, the display switching control signal is configured to control the sub-display screen to start displaying the $i^{th}$ segment stored in the sub-display screen; where i is an integer greater than 1 and not greater than N.

After displaying for a certain time, display asynchronism may occur between the sub-display screens due to their own characteristics, and thus the display switching control signal may be sent to each sub-display screen at a display point of a preset (e.g., each) target segment of the target display content, thereby controlling each sub-display screen to start displaying a corresponding sub-segment, and further preventing asynchronism in displaying of the sub-display screens after a long-time displaying.

As an example, after the spliced screen starts to display for a certain time, the display switching control signal may be sent to each sub-display screen at display points of target segments at a preset interval, so as to control the sub-display screens to synchronously display the corresponding sub-segments.

In some implementations, the display control signal may further include: a display stop control signal. In such case, the S11 may further include: S11c, in response to the time code signal indicating that the current time point reaches a display end point of the target display content, sending the display stop control signal to each sub-display screen, where the display stop control signal is configured for controlling the sub-display screen to stop displaying, for example, the sub-display screen may be controlled not to emit light.

In some implementations, the display control signal may further include a brightness adjusting signal, in such case, the S11 may further include: in response to that the current time point indicated by the time code signal reaches a preset brightness adjusting point, sending the brightness adjusting signal to each sub-display screen. The brightness adjusting signal is configured for adjusting the brightness of each sub-display screen. The brightness adjusting point may be set according to actual needs.

Figure 4:
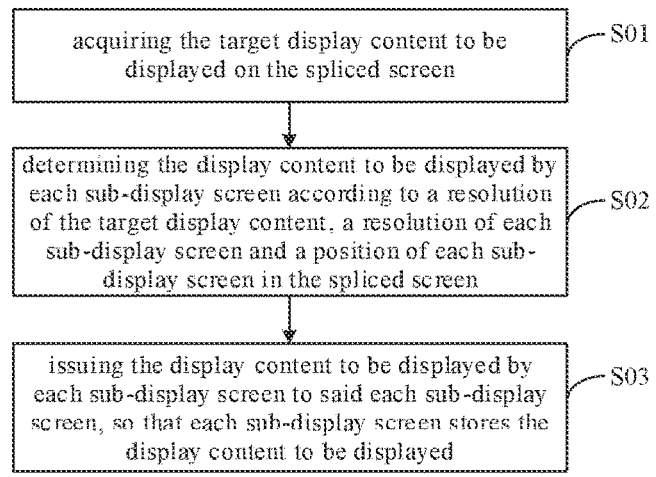
FIG. 4 is a schematic diagram of a process of issuing display content in a display control method according to an embodiment of the present disclosure.

In some implementations, the display control method may further include: before the S11, issuing the display content to each sub-display screen. FIG. 4 is a schematic diagram illustrating a process of issuing display content in the display control method according to the embodiment of the present disclosure, and as shown in FIG. 4, the process of issuing display content may include the following S01 to S03.

S01, acquiring the target display content to be displayed on the spliced screen.

The target display content may be prepared in advance according to the content and display effect required to be displayed in the performance process.

S02, determining the display content to be displayed by each sub-display screen according to a resolution of the target display content, a resolution of each sub-display screen and a position of each sub-display screen in the spliced screen.

S03, transmitting the display content to be displayed by each sub-display screen to said each sub-display screen, so that each sub-display screen stores the display content to be displayed.

The S03 may be executed by a display content development platform, and the display content to be displayed may be sent to the sub-display screen through 4G/5G signal network of the operator and through a customized VPDN (Virtual Private Dial-up network).

In the performance process, the sub-display screen may be held by an actor, the position of the sub-display screen in the spliced screen may be unfixed, and the sub-display screen may move among a plurality of preset positions. Therefore, in the S02, the display content to be displayed on the sub-display screen may be determined according to the plurality of preset positions corresponding to the sub-display screen. During performance, actors can advance among the plurality of preset positions at a proper time, so that the display contents displayed by the sub-display screens can be spliced into the complete target display content.

In addition, after the display content to be displayed on each sub-display is determined through the S02, an ID number of each sub-display may be bound to the display content to be displayed on the sub-display. In the S03, when the display content is issued to the sub-display screen, the display content to be displayed may be accurately issued to the corresponding sub-display screen according to the corresponding relationship between the ID number of the sub-display screen and the display content.

In addition, before the display content is issued to the sub-display screen, the display effect of each sub-display screen of the spliced screen may be simulated in advance, and when the simulated display effect reaches an expected target, the display content to be displayed by each sub-display screen is issued to said each sub-display screen.

In a second aspect, the present disclosure further provides a display control device of a spliced screen, where the spliced screen includes a plurality of sub-display screens. The display control device includes a display controller, and the display controller is configured for sending a display control signal to each sub-display screen in a wireless sending manner according to a time code signal. The time code signal indicates a current time point; the display control signal is configured for controlling each sub-display screen to perform corresponding display processing on the display content stored in the sub-display screen, so that the sub-display screens can display the target display content together.

In some implementations, the display controller may be a wireless signal base station (e.g., a LoRa transmitter) that transmits and receives wireless signals in a long distance.

Figure 5:
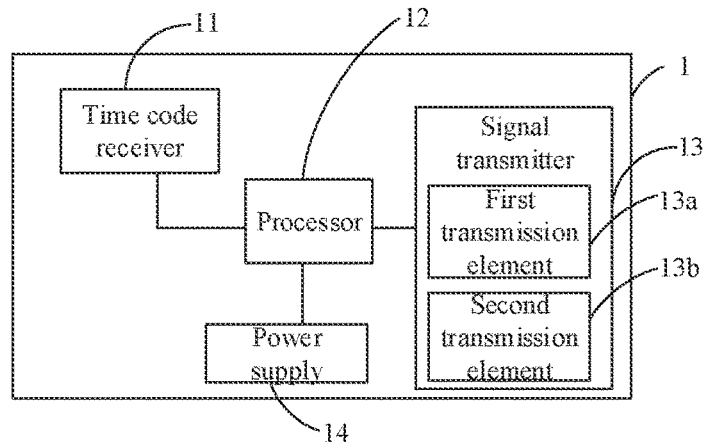
FIG. 5 is a schematic structural diagram of a display controller according to an embodiment of the present disclosure.

FIG. 5 is a schematic structural diagram of a display controller according to an embodiment of the present disclosure, and as shown in FIG. 5, the display controller 1 includes: a time code receiver 11, a processor 12, a signal transmitter 13 and a power supply 14. The time code receiver 11 is configured to receive the time code signal. The processor 12 is configured to determine whether the time code signal indicates that the current time point reaches a display start point of the target display content. When the processor 12 determines that the time code signal indicates that the current time point reaches the display start point of the target display content, the signal transmitter 13 sends a display start control signal to each sub-display screen. The power supply 14 is configured to supply power to the processor 12.

In some implementations, the display control signal further includes: a display stop control signal and a display switching control signal. The target display content includes N target segments distributed according to a time axis, the display content stored in each sub-display screen includes N sub-segments corresponding to the N target segments one to one, and N is an integer greater than 1.

The processor 12 is further configured to determine whether the time code signal indicates that the current time point reaches a display end point of the target display content, and determine whether the time code signal indicates that the current time point reaches a display point of the $i^{th}$ target segment. When the processor 12 determines that the time code signal indicates that the current time point reaches the display end point of the target display content, the signal transmitter 13 sends the display stop control signal to each sub-display screen; the display stop control signal is configured for controlling the sub-display screen to stop displaying. When the processor 12 determines that the time code signal indicates that the current time point reaches the display point of the $i^{th}$ target segment, the signal transmitter 13 sends the display switching control signal to each sub-display screen, where the display switching control signal is configured to control the sub-display screen to start displaying the $i^{th}$ sub-segment stored in the sub-display screen, and i is an integer greater than 1 and not greater than N.

The signal transmitter 13 may include a first transmission element 13a and a second transmission element 13b, the signal transmitter 13 simultaneously transmits signals through the first transmission element 13a and the second transmission element 13b each time, and the first transmission element 13a and the second transmission element 13b simultaneously transmit the control signal at different frequencies.

Figure 6:
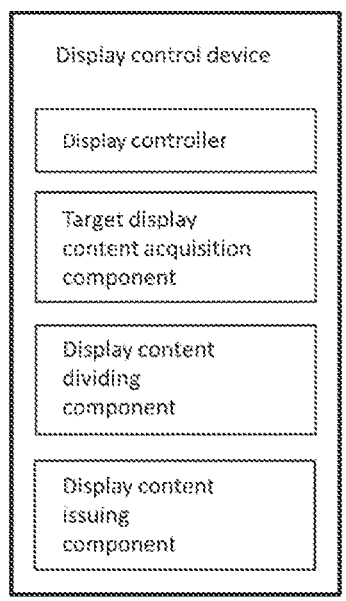
FIG. 6 is a schematic structural diagram of a display control device according to an embodiment of the present disclosure.

Further, as shown in FIG. 6, the display control device may further include: a target display content acquisition component 5, a target display content dividing component 6, and a target display content issuing component 7. The target display content acquisition component 5 is configured to acquire the target display content to be displayed on the spliced screen. The display content dividing component 6 is configured to determine the display content to be displayed on each sub-display screen according to the resolution of the target display content, the resolution of each sub-display screen, and the position of each sub-display screen in the spliced screen. The display content issuing component 7 is configured to issue the display content to be displayed on each sub-display screen to said each sub-display screen, so that each sub-display screen stores the display content to be displayed.

In some implementations, the display controller may further send a firmware upgrade signal to the sub-display screen, where the firmware upgrade signal is configured to control the sub-display screen to perform an OTA (over the air technology) upgrade, so as to update and upgrade an operating system (which may be an android system in particular) of the sub-display screen.

Figure 7:
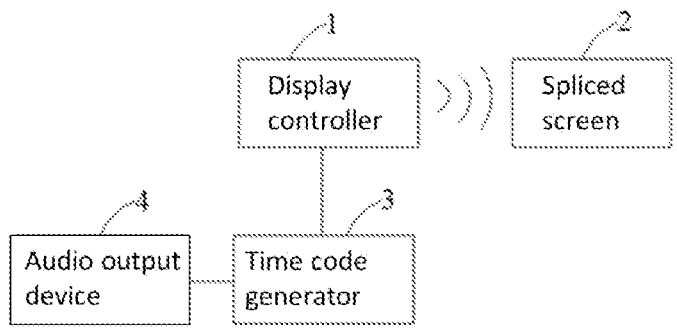
FIG. 7 is a schematic structural diagram of a part of a display system according to an embodiment of the present disclosure.

In a third aspect, the present disclosure further provides a display system, FIG. 7 is a schematic diagram of a partial structure of the display system according to an embodiment of the present disclosure, and as shown in FIG. 7, the display system may include a spliced screen 2, a time code generator 3, and the display control device described above. The time code generator 3 is configured to generate a time code signal according to a current time point and transmit the time code signal to the display controller 1 of the display control device. The time code generator 3 may transmit the time code signal to the display controller 1 through a data bus such as DMAX. The spliced screen 2 includes a plurality of sub-display screens, and each sub-display screen is configured to perform corresponding display processing on a display content stored in the sub-display screen according to the display control signal sent by the display controller 1, so that the sub-display screens collectively display a target display content. The sub-display screen may be an LED panel.

The display system may further include an audio output device 4, and the audio output device 4 is configured to output an audio signal corresponding to the target display content. The time code generator 3 is configured to transmit time code signals at preset time intervals during the audio output device 4 outputting the audio signal, so that the target display content displayed by the spliced screen is synchronized with the audio signal. The preset time interval may be 1 ms or other relatively short time interval. The process of generating the time code signal by the time code generator 3 has been exemplified above, and will not be described herein.

Figure 8:
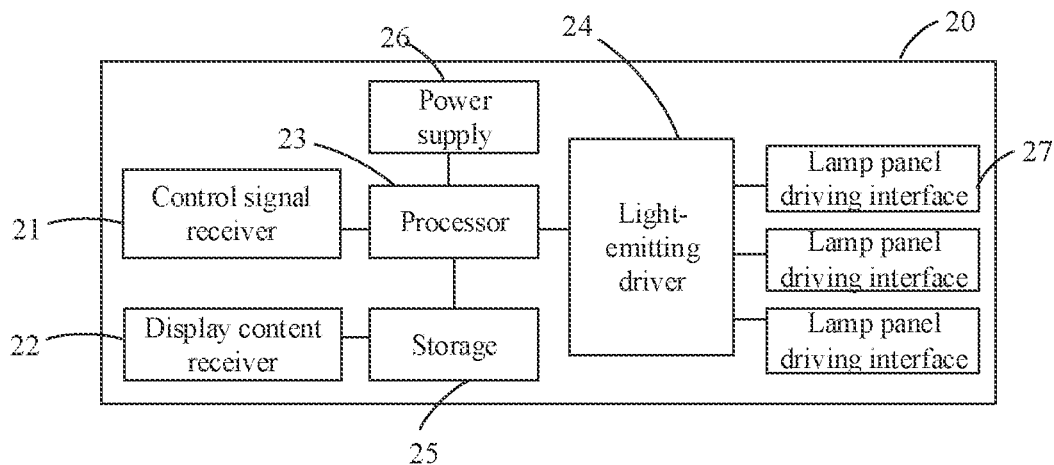
FIG. 8 is a schematic structural diagram of a sub-display screen of a spliced screen according to an embodiment of the present disclosure.

FIG. 8 is a schematic structural diagram of a sub-display screen of a spliced screen according to an embodiment of the present disclosure, and as shown in FIG. 8, the sub-display screen 20 may include: a control signal receiver 21, a display content receiver 22, a processor 23, a light-emitting driver 24, a storage 25, a power supply 26, a lamp panel driving interface 27, and the like. The control signal receiver 21 is configured to receive the display control signal transmitted by the display controller 1. The display content receiver 22 is configured to receive the display content issued by the display content issuing component; in addition, the display content receiver 22 may send verification information to the display content issuing component after receiving the display content issued by the display content issuing component. The display content issuing component determines whether the sub-display screen 20 completes the reception of the display content and whether the display content is correctly received according to the verification information. The light-emitting driver 24 is configured to provide light-emitting driving signals to the light emitting elements of the sub-display screen 20 to control the brightness of the light emitting elements. The processor 23 provides a master control signal to the light-emitting driver 24 according to the display control signal, so that the light-emitting driver 24 drives the light emitting elements (i.e., LEDs) to emit light or stop emitting light, or controls the brightness of the light emitting elements according to data of the display content stored. A lamp panel provided with the light emitting elements is coupled to the light emitting driver 24 through the lamp panel driving interface 27.

It should be understood that, in a case where the display control method in the first aspect, the display control device in the second aspect, and the display system in the third aspect are applied to control displaying of a large-scale spliced screen (for example, including thousands of sub-display screens), due to the inevitable presence of interferences (e.g., co-frequency interference, near-frequency interference, or the like) or obstacles in the environment where the sub-display screens are located, part of the sub-display screens may receive the display control signal too late (e.g., at a time later than that for displaying) or even cannot receive the display control signal. In order to ensure that the sub-display screens can accurately display the target display content together, the display control method in the first aspect, the display control device in the second aspect, and the display system in the third aspect may be improved into a solution with a higher reliability, to further ensure synchronous displaying of the sub-display screens.

Figure 9:
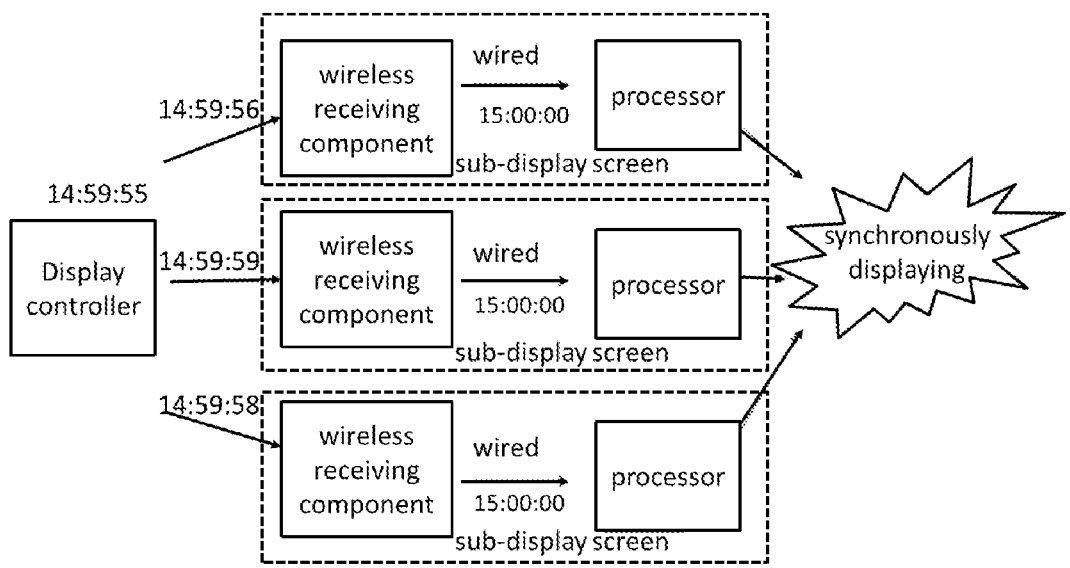
FIG. 9 is a schematic diagram illustrating a display control process of a spliced screen according to an embodiment of the present disclosure.

FIG. 9 is a schematic diagram of a display control process of a spliced screen according to an embodiment of the present disclosure. As shown in FIG. 9, the display controller (e.g., a LoRa transmitter) wirelessly sends a display control signal to each sub-display screen based on a time code signal (e.g., at a time of 14:59:55). Each sub-display screen receives the display control signal through a wireless receiving component (e.g., a LoRa receiving card). For example, the display control signal may be received by the sub-display screens at different times, and is converted into a wired signal (e.g., a wired signal conforming to RS-485 protocol) to be transmitted through a wire by each sub-display screen. Further, each sub-display screen reports status information (for example, including status information indicating that the display control signal is received, status information indicating a signal intensity of the display control signal received, status information indicating a time at which the display control signal is received, or the like) to the display controller. The display controller determines, whether all the sub-display screens have received the display control signal, based on the status information. After determining that all the sub-display screens have received the display control signal, the display controller sends an instruction including a start time (e.g., a preset unified time in future) to the sub-display screens. After receiving the instruction including the start time, wireless receiving components of the sub-display screens may uniformly (e.g., at a same time of 15:00:00) transmit wired signals, each converted from the display control signal, in a wired transmission manner to corresponding processors (e.g., graphics cards) to control the corresponding processors each to perform the corresponding display processing (e.g., displaying) on the display content stored in each sub-display screen.

With the display control process shown in FIG. 9, all sub-display screens can be ensured to display synchronously to jointly display the target display content.

In the embodiment of the present disclosure, for example, the display controller and the sub-display screens may be synchronized in time at a first preset time (e.g., during an initialization), for example, the time of each of the display controller and the sub-display screens may be automatically calibrated by using the network Time Protocol (NTP).

In such case, in response to that any sub-display screen does not receive the display control signal at a second preset time (for example, at a time prior to that for displaying by one to five seconds, and at this time, the display controller has already sent the display control signal), then the sub-display screen enters an independent display mode. In the independent display mode, each sub-display screen may follow a preset display schedule, for example, at a third preset time (e.g., at a time that each sub-display screen should start displaying), control the corresponding processor, through a wired signal transmitted in a wired transmission manner, to perform the corresponding display processing on the display content stored in the sub-display screen. In the independent display mode, each sub-display screen may not report the status information to the display controller.

The improved display control process of the spliced screen provided by the embodiment of the present disclosure can greatly improve an anti-interference ability of each sub-display screen and lower a fault probability of the entire spliced screen, thus is suitable for of any large-scale spliced screen.

In a fourth aspect, the present disclosure further provides an electronic device, which includes a memory and a processor, where the memory stores a computer program, and when the computer program is executed by the processor, the electronic device implements the display control method described above.

In a fifth aspect, the present disclosure further provide a computer readable storage medium, on which a computer program is stored, where the computer program is executed by a processor to implement the display control method described above.

The above-mentioned memory and the computer readable storage medium include, but are not limited to, the following readable medium: such as Random Access Memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, magnetic disk or tape, optical storage medium such as a Compact Disk (CD) or DVD (digital versatile disk), and other non-transitory medium. Examples of the processor include, but are not limited to, a general purpose processor, a Central Processing unit (CPU), a microprocessor, a Digital Signal Processor (DSP), a controller, a microcontroller, a state machine, and the like.

It should be noted that components or elements in the above embodiments may be implemented by software, hardware or a combination thereof, and the logical functional division of the components or elements does not represent the physical division, for example, a single component or element may be implemented by software distributed on different hardware, or may be implemented by cooperation of different hardware, and the software distributed on the single hardware or the single hardware may implement functions of multiple components or elements. The software may be, for example, a computer program stored in a computer readable medium and the hardware may be, for example, a memory, a processor, an integrated circuit, or the like.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A display control method of a spliced screen, the spliced screen comprises a plurality of sub-display screens, and the display control method comprises:

sending, by a display controller, a display control signal to each sub-display screen in a wireless sending manner according to a time code signal;

receiving, by each sub-display screen, the display control signal in a wired receiving manner, and reporting status information of each sub-display screen to the display controller; and determining, by the display controller, whether all the sub-display screens have received the display control signal, according to the status information of the sub-display screens;

after determining that the display control signal is received by all the sub-display screens, sending, by the display controller, an instruction including a start time to each sub-display screen, wherein the time code signal indicates a current time point; the display control signal is configured for controlling the sub-display screen to perform corresponding display processing on a display content stored in the sub-display screen, so that the sub-display screens display a target display content together; each sub-display screen starts, in response to that the start time reaches, to perform the corresponding display processing on the display content stored in the sub-display screen according to the display control signal.

2. The display control method of claim 1, wherein the status information of each sub-display screen includes at least one of: status information indicating that the display control signal is received, status information indicating a signal intensity of the display control signal received, or status information indicating a time at which the display control signal is received.

3. The display control method of claim 1, wherein the display control signal, after being received, is converted into a wired signal to be transmitted through a wire, and in response to that the start time reaches, a corresponding processor is controlled by each sub-display screen through the wired signal to perform the corresponding display processing on the display content stored in the sub-display screen.

4. The display control method of claim 1, further comprising:

synchronizing each sub-display screen with the display controller in time; and in response to that the display control signal is not received by any sub-display screen before a preset time, the sub-display screen entering an independent display mode and controlling a corresponding processor, by a wired signal transmitted through a wire, to perform the corresponding display processing on the display content stored in the sub-display screen according to a preset displaying schedule.

5. The display control method of claim 1, wherein the display control signal comprises: a display start control signal;

the sending, by a display controller, a display control signal to each sub-display screen in a wireless sending manner according to a time code signal comprises:

in response to the time code signal indicating that the current time point reaches a display start point of the target display content, sending, by the display controller, the display start control signal to each sub-display screen, wherein the display start control signal is configured for controlling the sub-display screen to start to display the display content stored in the sub-display screen.

6. The display control method of claim 5, wherein the display control signal further comprises: a display stop control signal;

the sending, by a display controller, the a display control signal to each sub-display screen in the a wireless sending manner according to the a time code signal further comprises:

in response to the time code signal indicating that the current time point reaches a display end point of the target display content, sending, by the display controller, the display stop control signal to each sub-display screen, wherein the display stop control signal is configured for controlling the sub-display screen to stop displaying.

7. The display control method of claim 5, wherein the target display content comprises N target segments distributed in a time axis, the display content stored in each sub-display screen comprises N sub-segments in one-to-one correspondence with the N target segments, N is an integer greater than 1; the display control signal further comprises: a display switching control signal;

the sending, by a display controller, a display control signal to each sub-display screen in a wireless sending manner according to a time code signal further comprises:

in response to the time code signal indicating that the current time point reaches a display point of the $i^{th}$ target segment, sending, by the display controller, the display switching control signal to each sub-display screen, wherein the display switching control signal is configured for controlling the sub-display screen to start to display the $i^{th}$ sub-segment stored in the sub-display screen; i is an integer greater than 1 and not greater than N.

8. The display control method of claim 1, wherein the display control signal comprises: a brightness adjusting signal;

the sending, by a display controller, a display control signal to each sub-display screen in a wireless sending manner according to a time code signal further comprises:

in response to that the current time point indicated by the time code signal reaches a preset brightness adjusting point, sending, by the display controller, the brightness adjusting signal to each sub-display screen, wherein the brightness adjusting signal is configured for adjusting brightness of each sub-display screen.

9. The display control method of any one of claim 1, further comprising:

before sending, by the display controller, the display control signal to each sub-display screen in the wireless transmission manner according to the time code signal, acquiring the target display content to be displayed on the spliced screen;

determining the display content to be displayed on each sub-display screen according to a resolution of the target display content, a resolution of each sub-display screen and a position of each sub-display screen in the spliced screen; and issuing the display content to be displayed by each sub-display screen to said each sub-display screen so that each sub-display screen stores the display content to be displayed.

10. An electronic device, comprising a memory and a processor, the memory having stored thereon a computer program which, when executed by the processor, implements the display control method of claim 1.

11. A non-transitory computer readable storage medium, storing a computer program thereon, which, when executed by a processor, implements the display control method of claim 1.

12. A display control device of a spliced screen, the spliced screen comprising a plurality of sub-display screens, and the display control device comprising:
  a display controller configured to send a display control signal to each sub-display screen in a wireless sending manner according to a time code signal, receive status information of each sub-display screen reported by the sub-display screen, determine whether all the sub-display screens have received the display control signal, according to the status information of the sub-display screens, and send an instruction including a start time to each sub-display screen after determining that the display control signal is received by all the sub-display screens, to instruct each sub-display screen starts, in response to that the start time reaches, to perform the corresponding display processing on the display content stored in the sub-display screen according to the display control signal, wherein the time code signal indicates a current time point; the display control signal is configured for controlling each sub-display screen to perform corresponding display processing on the display content stored in the sub-display screen, so that the sub-display screens display a target display content together.

13. The display control device of claim 12, wherein the status information of each sub-display screen includes at least one of: status information indicating that the display control signal is received, status information indicating a signal intensity of the display control signal received, or status information indicating a time at which the display control signal is received.

14. The display control device of claim 12, wherein the display controller is configured to: instruct each sub-display screen controls, in response to that the start time reaches, a corresponding processor signal, by a wired signal transmitted through a wire and converted from the display control signal, to perform the corresponding display processing on the display content stored in the sub-display screen.

15. The display control device of claim 12, wherein the display controller is further configured to be synchronized with each sub-display screen in time.

16. The display control device of claim 12, wherein the display control signal comprises: a display start control signal;
  the display controller comprises:
    a processor configured to determine whether the time code signal indicates that the current time point reaches a display start point of the target display content; and
    a signal transmitter configured to send the display start control signal to each sub-display screen in response to the time code signal indicating that the current time point reaches the display start point of the target display content, wherein the display start control signal is configured for controlling the sub-display screen to start displaying the display content stored in the sub-display screen.

17. The display control device of claim 16, wherein the target display content comprises N target segments distributed in a time axis, the display content stored in each sub-display screen comprises N sub-segments in one-to-one correspondence with the N target segments, N being an integer greater than 1; the display control signal further comprises: a display switching control signal;
  the processor is further configured to determine whether the time code signal indicates that the current time point reaches a display point of the $i^{th}$ target segment;
  the signal transmitter is further configured to send the display switching control signal to each sub-display screen in response to the time code signal indicating that the current time point reaches the display point of the $i^{th}$ target segment, wherein the display switching control signal is configured for controlling the sub-display screen to start displaying the $i^{th}$ sub-segment stored in the sub-display screen; wherein i is an integer greater than 1 and not greater than N.

18. A display system, comprising: a spliced screen, a time code generator and a display control device of claim 12, and the time code generator is configured to generate a time code signal from a current time point and to send the time code signal to the display control device;
  the spliced screen comprises a plurality of sub-display screens, and each sub-display screen is configured to perform corresponding display processing on the display content stored in the sub-display screen according to the display control signal sent by the display control device, so that the sub-display screens display a target display content together.

* * * * *